(12) United States Patent
Suzuki

(10) Patent No.: US 6,683,536 B2
(45) Date of Patent: Jan. 27, 2004

(54) DISPLAY APPARATUS FOR NAVIGATIONAL AID

(75) Inventor: Tomohiko Suzuki, Nishinomiya (JP)

(73) Assignee: Furuno Electric Company, Ltd., Hyogo-ken (JP)

(*) Notice: Subject to any disclaimer, the term of this patent is extended or adjusted under 35 U.S.C. 154(b) by 142 days.

(21) Appl. No.: 09/927,363

(22) Filed: Aug. 13, 2001

(65) Prior Publication Data

US 2002/0027513 A1 Mar. 7, 2002

(30) Foreign Application Priority Data

Aug. 28, 2000 (JP) .................................... 2000-256944

(51) Int. Cl.[7] ................................................ G08B 5/00
(52) U.S. Cl. ................................... 340/815.4; 701/301
(58) Field of Search ........................... 340/815.4, 984, 340/985, 525; 700/83, 17; 701/301

(56) References Cited

U.S. PATENT DOCUMENTS

| | | | | |
|---|---|---|---|---|
| 4,223,628 A | * | 9/1980 | Higuti et al. ............... | 114/246 |
| 4,281,326 A | * | 7/1981 | Anderson .................... | 342/41 |
| 4,356,784 A | * | 11/1982 | Waters et al. ............... | 114/248 |
| 5,754,429 A | * | 5/1998 | Ishihara et al. ............ | 701/200 |
| 5,969,665 A | * | 10/1999 | Yufa .......................... | 342/41 |

* cited by examiner

Primary Examiner—John Tweel
(74) Attorney, Agent, or Firm—Birch, Stewart, Kolasch & Birch, LLP

(57) ABSTRACT

A display apparatus for a navigational aid displays an own ship mark and a barge assembly mark representing respectively the shapes of own ship and a barge assembly, which are coupled to each other, in which the barge assembly mark includes segments arranged in columns by rows corresponding to individual barges within the barge assembly. The display apparatus reads information on a choice of a location within the barge assembly mark entered by an operator using a pointer and shows a mark indicating the presence or absence of a barge at the selected location, thereby enabling the operator to set the barge assembly mark of a desired shape to match the shape of the actual barge assembly.

11 Claims, 5 Drawing Sheets

(A)

(B)

(C)

(A)

(B)

(C)

DISPLAY APPARATUS FOR NAVIGATIONAL AID

BACKGROUND OF THE INVENTION AND RELATED ART STATEMENT

The present invention relates to a display apparatus for a navigational aid for displaying navigational information on a pusher boat carrying barges, for example.

Conventionally, when conveying barges from one port to another, several unpowered barges are often lashed together in an assembly and this barge assembly is pushed by a pusher boat which is coupled to the assembly.

To aid in navigation of a pusher boat carrying a barge assembly of this kind, a radar system has usually been used, in which a radar indicator presented an own ship mark representing the shape and the heading of the pusher boat at a sweep center (own ship position) together with a mark resembling the shape of the barge assembly.

FIG. 8 shows an example of an own ship mark and a mark representing the shape of a barge assembly presented on a screen of a conventional radar system, in which "S" designates the own ship mark and "B" designates the mark of the barge assembly. While a small rectangular area shown by broken lines represents the size of one individual barge, no indication of individual barges of this form has actually been provided in the conventional system.

In actual situations of transportation, however, one barge indicated by the broken lines may be removed from the barge assembly shown in FIG. 8 at one site and the barge assembly consisting of the remaining barges could be pushed together to a next site. One problem of the conventional radar system, or other navigational aid display apparatus, is that the on-screen barge assembly mark does not exactly represent the shape of the barge assembly in such cases, making it impossible for a navigator to recognize the correct shape of the barge assembly being transported on the screen, which also displays situations surrounding the own ship. Thus, there has still been a room for improvement in the conventional system to be used as a navigational aid for enhancing safety and efficiency in transporting barge assemblies.

SUMMARY OF THE INVENTION

Accordingly, it is an object of the invention to provide a navigational aid display apparatus which makes it possible to set and display a mark of a barge assembly correctly representing its shape, thereby overcoming the aforementioned problem of the prior art.

In one aspect of the invention, a display apparatus for a navigational aid for displaying an own ship mark and a barge assembly mark representing respectively the shapes of own ship and a barge assembly, which are coupled to each other, together with an image produced by the navigational aid indicating the position of own ship and her surrounding situations comprises means for displaying boundaries of adjacent barges constituting the barge assembly, and means for displaying a mark indicating the presence or absence of a barge at each location within the barge assembly mark according to a signal fed from an input terminal.

In another aspect of the invention, a display apparatus for a navigational aid for a navigational aid for displaying an own ship mark and a barge assembly mark representing respectively the shapes of own ship and a barge assembly, which are coupled to each other, together with an image produced by the navigational aid indicating the position of own ship and her surrounding situations comprises means for displaying boundaries of adjacent barges constituting the barge assembly, means for reading information on a choice of a location within the barge assembly mark entered by an operator using a pointer indicating the location of a desired barge, and means for displaying a mark indicating the presence or absence of a barge at the location selected by the operator.

In still another aspect of the invention, a display apparatus for a navigational aid for displaying an own ship mark and a barge assembly mark representing respectively the shapes of own ship and a barge assembly, which are coupled to each other, together with an image produced by the navigational aid indicating the position of own ship and her surrounding situations comprises means for reading numeric values or symbols on a pattern of the barge assembly or the locations of individual barges constituting the barge assembly, and means for displaying the pattern of the barge assembly, or a mark indicating the presence or absence of a barge at each location within the barge assembly mark according to the read numeric values or symbols.

In yet another aspect of the invention, a display apparatus for a navigational aid for displaying an own ship mark and a barge assembly mark representing respectively the shapes of own ship and a barge assembly, which are coupled to each other, together with an image produced by the navigational aid indicating the position of own ship and her surrounding situations comprises keys arranged in conformity with the arrangement of individual barges of the barge assembly, and means for reading operator inputs entered via the keys and displaying a mark indicating the presence or absence of a barge at each location within the barge assembly mark.

The navigational aid display apparatus thus constructed enables the operator to set the shape of the barge assembly mark, which is displayed on a screen of the navigational aid together with the own ship mark, to match the shape of the actual barge assembly.

In one form of the invention, the image produced by the navigational aid is an image of target echoes detected by radar installed on the own ship (e.g., pusher boat). This means that the display apparatus for the navigational aid of the invention superimposes the own ship mark and the barge assembly mark representing respectively the shapes of the own ship and the barge assembly pushed by the own ship on a radar image. This enables the operator to recognize the own ship position and her surrounding situations from the radar image as well as relationship between the own ship and the barge assembly.

In another aspect of the invention, a display apparatus for a navigational aid for displaying an own ship mark and a barge assembly mark representing respectively the shapes of own ship and a barge assembly, which are coupled to each other, together with an image provided by the navigational aid indicating the position of own ship and her surrounding situations comprises means for inputting a shape modification signal, means for generating based on the shape modification signal a signal representing the shape of the barge assembly newly formed, and means for displaying the outer shape mark of the barge assembly based on the signal from said signal generating means.

In yet another aspect of the invention, a radar apparatus for displaying an own ship mark and a barge assembly mark representing respectively the shapes of own ship and a barge assembly, which are coupled to each other, together with radar echo signals comprises means for inputting a shape modification signal, means for generating based on the shape modification signal a signal representing the shape of the barge assembly newly formed, and means for displaying the outer shape mark of the barge assembly based on the signal from said signal generating means.

In yet another aspect of the invention, a radar apparatus for transmitting radio signals and receiving echo signals by means of an antenna to search conditions around the own ship and for displaying on an indicator a mark representative of the size of own ship and a mark representative of the shape of a barge assembly coupled to the ship together with the surrounding conditions, said radar apparatus comprising an analog-to digital converter for converting echo signals received by said antenna into digital signals, a memory for storing the digital signals from said analog-to-digital converter, a signal processing circuit for converting the signals from said analog-to-digital converter from a polar coordinate system into a Cartesian coordinate system, a first display memory for storing the resultant converted signals from said signal processing circuit, an input terminal for producing a control signal to vary the shape of a barge assembly, a data processing circuit for producing mark signals for displaying a mark representative of a shape of a barge assembly in response to the control signal, a second display memory for storing the mark signals from said data processing circuit and the mark signals for displaying a mark representative of the own ship, and a display control circuit for displaying on said indicator the mark representative of the own ship and the mark representative of a shape of a barge assembly with radar images based on the signals from said first display memory and said second display memory.

According to the invention, it is possible to display the barge assembly mark in any shape matching the shape of the actual barge assembly together with an image produced by the navigational aid indicating the surrounding situations of own ship. This allows the operator to correctly recognize the shape of the actual barge assembly being transported, thereby assisting in enhancing the safety of the barge assembly and the efficiency of its transportation.

In particular, when the boundaries between adjacent barges constituting a barge assembly are displayed and the location of each desired barge is specified by means of the pointer, it is possible to easily set the pattern of any given barge assembly.

Furthermore, if an arrangement is made to set the pattern of the barge assembly by entering numeric values or symbols through a keyboard, it is possible to easily set the pattern of any given barge assembly.

Moreover, if an arrangement is made to set the presence or absence of a barge at each location within the barge assembly mark by using an input device including keys, for instance, arranged in conformity with the arrangement of individual barges of the barge assembly, it is easy for the operator to recognize the correspondence between the positions of the individual keys and the locations of the barges and to set the pattern of any given barge assembly.

DETAILED DESCRIPTION OF THE PREFERRED EMBODIMENTS OF THE INVENTION

The invention is now described in conjunction with radar systems, which are typical examples of navigational aid display apparatus, according to preferred embodiments of the invention.

First, the construction of a radar system (navigational aid display apparatus) according to a first embodiment of the invention is described with reference to FIGS. 1 to 4.

Figure 1:
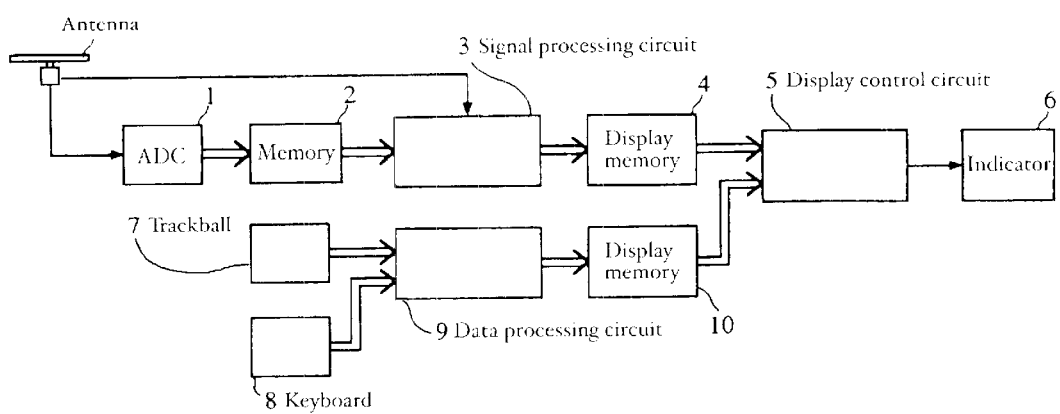
FIG. 1 is a block diagram showing the construction of a radar system according to a first embodiment of the invention.

FIG. 1 is a block diagram of the radar system. An analog-to-digital (A/D) converter 1 converts a video signal representing received radar echoes into digital data using multiple bits for each sample and sends the digital data to a memory 2. The memory 2 stores echo data derived from one sweep, that is, the data received from one direction following a single transmission of a pulse of radio waves, or stores echo data derived from multiple sweeps on a first-in-first-out (FIFO) basis. A signal processing circuit 3 including an application specific integrated circuit (ASIC) receives a trigger signal which determines transmission timing of each transmitting pulse, a heading pulse produced by an antenna when the antenna is directed in the direction of own ship's heading, and bearing pulses produced at regular intervals as the antenna rotates, and performs specific signal processing operation for on-screen presentation of the radar echoes based on these pulse signals. Specifically, the signal processing circuit 3 reads out the echo data of the latest one sweep temporarily stored in the memory 2, converts this data from a polar coordinate system into a Cartesian coordinate system to adapt the data to Cartesian coordinate display format, and writes resultant display data in a display memory 4. A display control circuit 5 sequentially reads out the display data for one frame of picture written in the display memory 4 in synchronism with raster-scan timing of an indicator 6 and generates and outputs a video signal. The indicator 6 displays the radar echoes based on the video signal received from the display control circuit 5.

A trackball 7 is a pointing device for moving a cross cursor to a desired position on a screen of the indicator 6 and a keyboard 8 is an operator terminal used for setting or altering the shape of a barge assembly and for selecting a presentation mode and a display range, etc. A data processing circuit 9 reads settings entered through the trackball 7 and the keyboard 8 and performs corresponding processing operation and writes data to be displayed (superimposed on a radar image) on the indicator 6 in a display memory 10. The display control circuit 5 takes in signals from both the display memory 4 and the display memory 10 whose data is written by the data processing circuit 9 with prescribed timing and generates a display signal. The indicator 6 displays a superimposed picture of the radar image fed from the display memory 4 and the data fed from the display memory 10.

Figure 2:
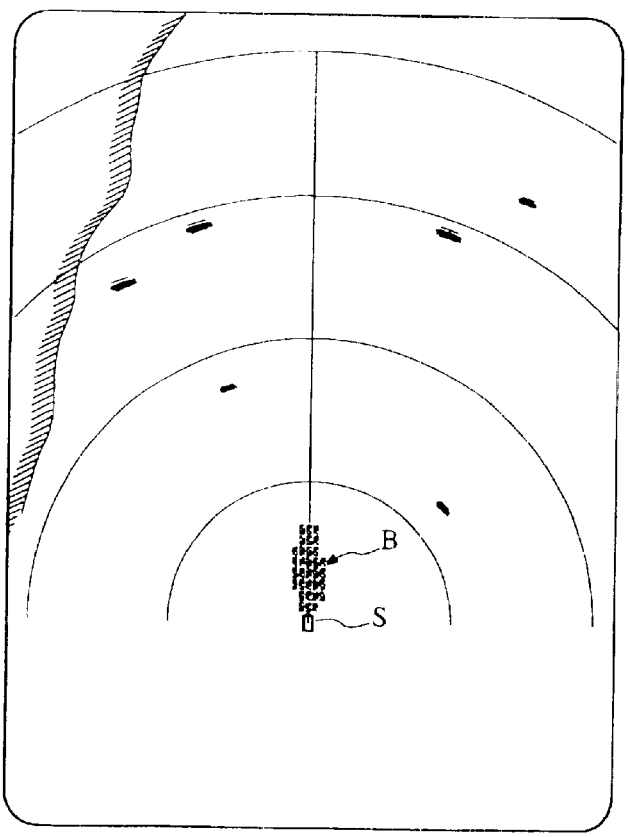
FIG. 2 is a diagram showing an example of on-screen display of an own ship mark and the barge assembly mark provided by the radar system of FIG. 1.
Figure 3:
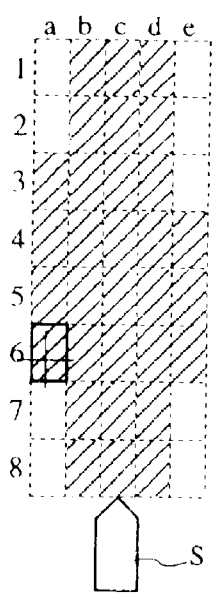
FIGS. 3A–3C are diagrams showing other examples of on-screen display of the own ship mark and the barge assembly mark.
Figure 3:
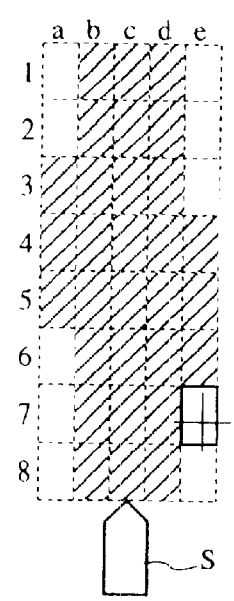
Figure 3:
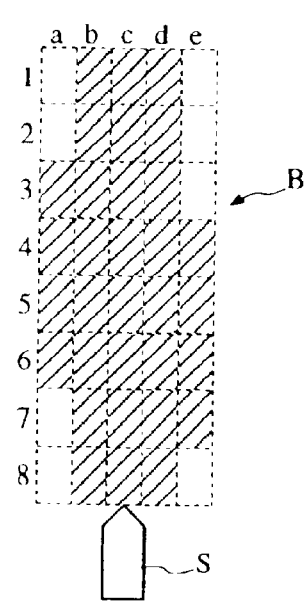

FIG. 2 is a diagram showing an example of on-screen display provided on the indicator 6. In this Figure, "S" designates an own ship mark indicating the position and heading of own ship and "B" designates a barge assembly mark indicating the position and shape of a barge assembly, wherein the two marks correctly represent the relative positions and sizes of the barge assembly and own ship. Displayed around the own ship mark S and the barge assembly mark B are radar echoes detected by the antenna. Since the antenna is installed on own ship, the range to a target on the radar screen corresponds to the distance from own ship to the target.

FIGS. 3A to 3C are diagrams showing other examples of on-screen display of the own ship mark S and the barge assembly mark B. Referring to FIG. 3A, for example, the mark B made up of 5 columns designated "a" to "e" by 8 rows designated "1" to "8" represents a standardized maximum size of a barge assembly, with small rectangular segments painted (hatched as illustrated) or blank to indicate the presence or absence of barges at corresponding locations. Expressing each segment by a combination of a letter designating the column and a numeral designating the row, the segments 1a, 2a, 7a, 8a, 1e, 2e, 3e, 7e and 8e are blank where no barges are present, whereas the other segments are painted where barges are present in the example of FIG. 3A. Regardless of whether the barges are present or not, the individual segments are marked by broken lines to show their locations.

If, for example, the barge at the segment 6a has been removed from the barge assembly depicted in FIG. 3A, an operator should follow a procedure explained below to ensure that the barge assembly mark B matches the true shape of the barge assembly.

First, the operator should place the cross cursor pointer on the segment 6a by using the trackball 7. At this point, the frame of the segment 6a becomes highlighted indicating that the segment 6a is currently selected. The operator then presses a barge assembly shape set key in this condition. As a result, the segment 6a turns blank as shown in FIG. 3B, whereby the barge assembly mark B on the screen matches the shape of the barge assembly.

Furthermore, if an additional barge is lashed at the segment 7e of the barge assembly depicted in FIG. 3B, the operator should follow a procedure explained below.

The operator should place the cross cursor pointer on the segment 7e by using the trackball 7 to highlight the frame of the segment 7e and press the barge assembly shape set key. As a result, the segment 7e is painted as shown in FIG. 3C, whereby the barge assembly mark B on the screen matches the shape of the barge assembly.

Figure 4:
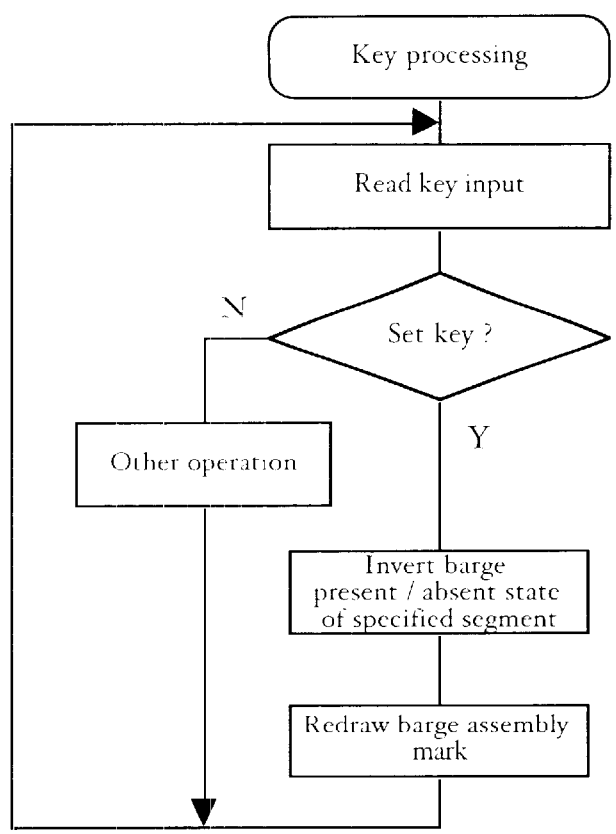
FIG. 4 is a diagram showing flowcharts of data processing procedures followed by a data processing circuit shown in FIG. 1.
Figure 4:
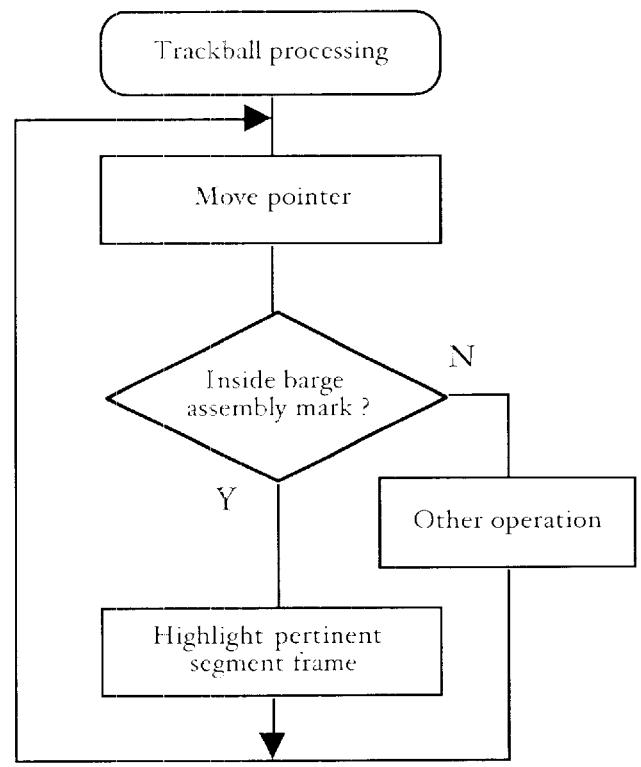

Data processing procedures carried out by the data processing circuit 9 of FIG. 1 for controlling the on-screen display are now explained referring to flowcharts shown in FIG. 4.

When the operator manipulates the trackball 7, the data processing circuit 9 reads information on the amount of manipulation and performs trackball processing operation, in which the data processing circuit 9 shifts the cross cursor pointer on the screen according to the movement of the trackball 7. When the cross cursor pointer is placed on one of the rectangular segments within the barge assembly mark B as shown in FIGS. 3A and 3B, the frame of the pertinent segment is highlighted. If the pointer is located outside the barge assembly mark B, the data processing circuit 9 performs other operation according to the current position of the pointer.

When the operator manipulates the keyboard 8, the data processing circuit 9 reads information on key input. If the barge assembly shape set key has been pressed, the barge assembly present/absent state of a currently selected segment indicated by the highlighted segment frame is inverted. As an example, if the barge assembly shape set key is pressed when the currently selected segment 6a is painted (or hatched) indicating that a barge is present at the corresponding location as shown in FIG. 3A, the segment 6a turns blank to indicate that no barge is now present there. Contrary to this, if the barge assembly shape set key is pressed when the currently selected segment 7e is blank indicating that no barge is present at the corresponding location as shown in FIG. 3B, for example, the segment 7e becomes painted (or hatched) to indicate that a barge is now present there.

The data processing circuit 9 then redraws the barge assembly mark B representing the barge present/absent states of the individual segments, such that the barge assembly mark B correctly indicates the current shape of the barge assembly.

The data processing circuit 9 performs operations relevant to specific key inputs when keys other than the barge assembly shape set key are pressed.

As thus far described, the boundaries of individual barges potentially forming a barge assembly are displayed on-screen, so that it is possible to specify a desired barge by means of the cross cursor pointer.

Figure 5:
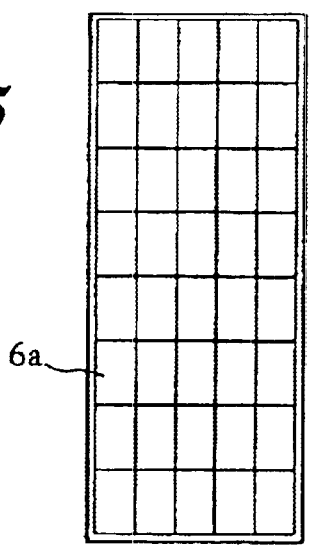
FIG. 5 is a diagram showing a keypad of a radar system according to a second embodiment of the invention.
Figure 8:
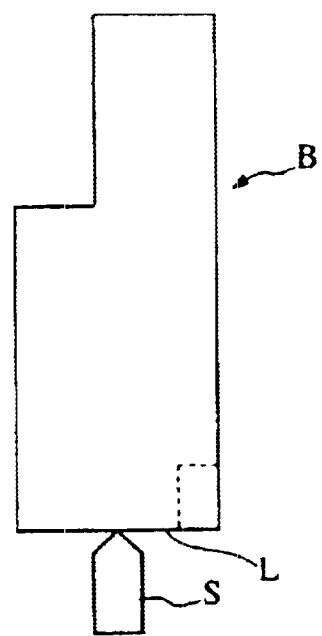
FIG. 8 is a diagram showing an example of a barge assembly mark and an own ship mark presented on-screen by a conventional radar system.
Figure 6:
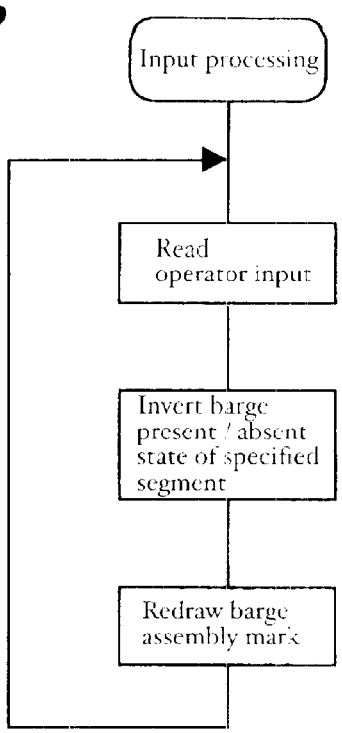
FIG. 6 is a diagram showing a flowchart of a data processing procedure followed by a data processing circuit of the radar system according to the second embodiment.

The construction of a radar system (navigational aid display apparatus) according to a second embodiment of the invention is now described with reference to FIGS. 5 and 6.

While the barge present/absent state of a specific segment is inverted by placing the cross cursor pointer on the relevant segment by operating the trackball 7 in the above-described first embodiment, the second embodiment enables the operator to select a barge by specifying its location via the keyboard 8 without using a pointing device like the trackball 7. Shown in FIG. 5 is a keypad made up of keys arranged in columns and rows representing the configuration of individual barges, which may either be present or absent, of a barge assembly mark B. The barge present/absent state of each segment can be inverted by pressing a corresponding key on the keypad.

The radar system of the second embodiment has the same construction as the radar system of the first embodiment whose block diagram is shown in FIG. 1. FIG. 6 is a flowchart showing a data processing procedure carried out by the data processing circuit 9 of the radar system. When the operator manipulates the keypad, the data processing circuit 9 reads information on key input and inverts the barge present/absent state of a segment corresponding to the pressed key. If the key corresponding to the segment 6a shown in FIG. 5 is pressed when the segment 6a is painted (or hatched) indicating that a barge is present at the corresponding location, for example, the segment 6a turns blank to indicate that no barge is now present there. The data processing circuit 9 then redraws the barge assembly mark B representing the barge present/absent states of the individual segments, such that the barge assembly mark B correctly indicates the current shape of the barge assembly.

While the aforementioned radar system of the second embodiment employs the keypad as an input device including the keys arranged in columns and rows representing the configuration of the individual barges, the input device is not limited to this type of keypad. Instead, a touch screen or a tablet may be used as an input device.

The construction of a radar system (navigational aid display apparatus) according to a third embodiment of the invention is now described with reference to FIGS. 7A–7C.

The radar system of the third embodiment is characterized in that the operator specifies a barge using an alphanumeric key, for instance, without using any pointing device like the aforementioned trackball or any dedicated input device like the aforementioned keypad imitating the arrangement of individual barges of a barge assembly.

Figure 7:
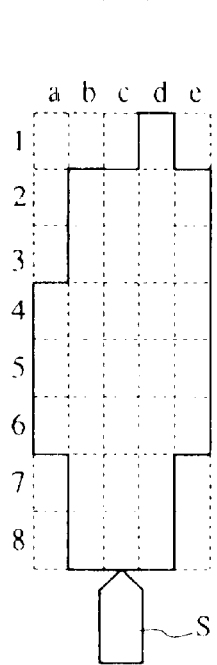
FIGS. 7A–7C are diagrams showing examples of on-screen display of an own ship mark and a barge assembly mark provided by a radar system of a third embodiment.
Figure 7:
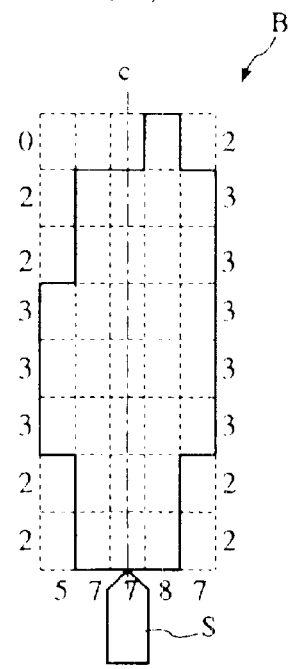
Figure 7:
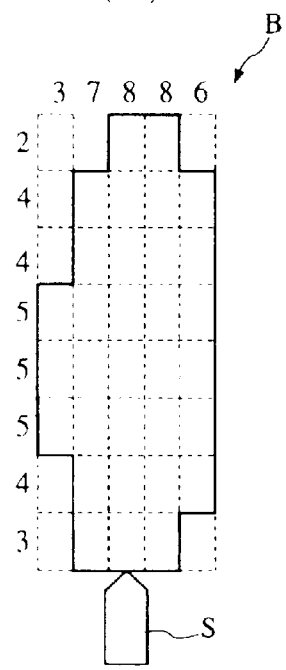

FIGS. 7A–7C are diagrams showing examples of on-screen display of an own ship mark S and a barge assembly mark B. Referring to FIG. 7A, for example, the locations of the individual barges, whether present or absent, are displayed on-screen by small rectangular segments arranged in 5 columns by 8 rows associated with the letters "a" to "e" and the FIGS. "1" to "8." A combination of a letter designating a column and a numeral designating a row is used to invert the barge present/absent state of a specific segment. To specify the segment 6a and invert the present/absent state of the corresponding barge in FIG. 7A, for example, the operator should press the keys "6" and "a" in this sequence. The barge present/absent state of the segment 6a as shown on the screen is then inverted.

FIG. 7B shows an alternative way of setting the pattern of a barge assembly. In this example, the operator sets the pattern of the barge assembly by entering the number of segments where barges are present as counted from the center line c of the barge assembly to the left and the number of segments where barges are present as counted from the center line c to the right in each row, starting from the bottommost row (i.e., the row closest to the own ship mark S) to the uppermost row (i.e., the row farthest away from the own ship mark S) in which any barge is present, as well as the number of rows as counted from the bottommost row up to a row where a barge is present in each column. In the example of FIG. 7B, the operator enters "2," "2," "2," "2," "3," "3," "3," "3," "3," "3," "2," "3," "2," "3," "0" and "2" for left and right sides alternately, starting from the bottommost row which is closest to the own ship mark S. The operator further enters "5," "7," "7," "8" and "7" to specify the number of rows as counted from the bottommost row up to the row where a barge is present in each column, from left to right.

FIG. 7C shows a still alternative way of setting the pattern of a barge assembly. In this example, the operator sets the pattern of the barge assembly by entering the number of segments where barges are present in each row as well as the number of segments where barges are present in each column. Specifically, the operator enters "3," "4," "5," "5," "5," "4," "4" and "2" to specify the number of barges in each row, starting from the bottommost row which is closest to the own ship mark S. Subsequently, the operator enters "3," "7," "8," "8" and "6" to specify the number of barges in each column, from left to right.

The radar system of the third embodiment has the same construction as the radar system of the first embodiment whose block diagram is shown in FIG. 1. Also, the data processing circuit 9 of the radar system of the third embodiment carries out the same data processing procedure as shown in FIG. 6. When the operator presses any key(s), the data processing circuit 9 reads information on key input and inverts the barge present/absent state of a segment corresponding to the pressed key(s). The data processing circuit 9 then redraws the barge assembly mark B representing the barge present/absent states of the individual segments, such that the barge assembly mark B correctly indicates the current shape of the barge assembly.

While the barge assembly mark B includes rectangular segments arranged in 5 columns by 8 rows representing the standardized maximum size of a barge assembly in the foregoing embodiments, this invention is not limited to this form. The invention may be adapted to display a barge assembly mark of a desired shape and maximum size. Also, the operator may be allowed to preset a desired maximum size of a barge assembly and its shape formed when the maximum number of barges are lashed together.

Although the individual segments of the barge assembly mark B are painted (hatched as illustrated) where barges are present and shown blank where no barges are present in the foregoing embodiments, the invention is not limited to this form of presentation. What is essential in this invention is that the appearance of the segments should differ depending on whether barges are present at the corresponding locations. As an example, only the segment frames may be displayed where barges are present without displaying any segment frames where no barges are present to enable the operator to recognize the barge present/absent state of each segment.

Furthermore, although the shapes of an own ship and a barge assembly coupled to the own ship are superimposed on a radar image presented on the indicator 6 of the radar system in the foregoing embodiments, the invention is not limited to this form of application. For example, the marks B and S representing respectively the barge assembly and the own ship which are coupled to each other may be displayed on a display apparatus of a navigational aid for displaying the plotted course of the own ship together with an electronic chart.

What is claimed is:

1. A display apparatus for a navigational aid for displaying an own ship mark and a barge assembly mark representing respectively the shapes of an own ship and a barge assembly, which are coupled to each other, together with an image produced by the navigational aid indicating the position of the own ship and her surrounding situations, said display apparatus comprising:

means for displaying boundaries of adjacent barges constituting the barge assembly; and means for displaying a mark indicating the presence or absence of a barge at each location within the barge assembly mark according to a signal fed from an input terminal.

2. A display apparatus for a navigational aid for displaying an own ship mark and a barge assembly mark representing respectively the shapes of an own ship and a barge assembly, which are coupled to each other, together with an image produced by the navigational aid indicating the position of the own ship and her surrounding situations, said display apparatus comprising:

means for displaying boundaries of adjacent barges constituting the barge assembly;

means for reading information on a choice of a location within the barge assembly mark entered by an operator using a pointer indicating the location of a desired barge; and means for displaying a mark indicating the presence or absence of a barge at the location selected by the operator.

3. A display apparatus for a navigational aid for displaying an own ship mark and a barge assembly mark representing respectively the shapes of an own ship and a barge assembly, which are coupled to each other, together with an image produced by the navigational aid indicating the position of the own ship and her surrounding situations, said display apparatus comprising:

means for reading numeric values or symbols on a pattern of the barge assembly or the locations of individual barges constituting the barge assembly; and means for displaying the pattern of the barge assembly, or a mark indicating the presence or absence of a barge at each location within the barge assembly mark according to the read numeric values or symbols.

4. A display apparatus for a navigational aid for displaying an own ship mark and a barge assembly mark representing respectively the shapes of an own ship and a barge assembly, which are coupled to each other, together with an image produced by the navigational aid indicating the position of the own ship and her surrounding situations, said display apparatus comprising:

an input device having discrete input portions arranged in conformity with the arrangement of individual barges of the barge assembly; and means for reading operator inputs entered via the input device and displaying a mark indicating the presence or absence of a barge at each location within the barge assembly mark.

5. A display apparatus for a navigational aid according to claim 1, wherein the image produced by the navigational aid is an image of target echoes detected by a radar installed on own ship.

6. A display apparatus for a navigational aid for displaying an own ship mark and a barge assembly mark representing respectively the shapes of an own ship and a barge assembly, which are coupled to each other, together with an image produced by the navigational aid indicating the position of the own ship and her surrounding situations, said display apparatus comprising:

means for inputting a shape modification signal;

means for generating based on the shape modification signal a signal representing the shape of the barge assembly newly formed; and means for displaying the outer shape mark of the barge assembly based on the signal from said means for generating a signal.

7. A radar apparatus for displaying an own ship mark and a barge assembly mark representing respectively the shapes of an own ship and a barge assembly, which are coupled to each other, together with radar echo signals, said radar apparatus comprising:

means for inputting a shape modification signal;

means for generating based on the shape modification signal a signal representing the shape of the barge assembly newly formed; and means for displaying the outer shape mark of the barge assembly based on the signal from said signal generating means.

8. A radar apparatus for transmitting radio signals and receiving echo signals by means of an antenna to search conditions around an own ship and for displaying on an indicator a mark representative of the size of the own ship and a mark representative of the shape of a barge assembly coupled to the own ship together with the surrounding conditions, said radar apparatus comprising:

an analog-to-digital converter for converting echo signals received by said antenna into digital signals;

a memory for storing the digital signals form said analog-to-digital converter;

a signal processing circuit for converting the signals from said analog-to-digital converter from a polar coordinate system into a Cartesian coordinate system;

a first display memory for storing the resultant converted signals from said signal processing circuit;

an input terminal for producing a control signal to vary the shape of a barge assembly;

a data processing circuit for producing mark signals for displaying a mark representative of a shape of a barge assembly in response to the control signal;

a second display memory for storing the mark signals from said data processing circuit and the mark signals for displaying a mark representative of the own ship; and a display control circuit for displaying on said indicator the mark representative of the own ship and the mark representative of a shape of a barge assembly with radar images based on the signals from said first display memory and said second display memory.

9. An apparatus for displaying a navigational aid, comprising:

an input device;

a controller for receiving input from said input device and outputting a display signal in response; and a display for receiving said display signal and displaying an image including a position indication of a ship and an associated barge assembly, formed from a plurality of individual barges, wherein said barge assembly being configurable in response to said input.

10. A method for displaying a navigational aid, comprising:

displaying an image including a position indication of a ship and an associated barge assembly formed from a plurality of individual barges; and receiving an input and changing the configuration of said barge assembly in response to said input.

11. A machine-readable medium having stored thereon a plurality of executable instructions, the plurality of instructions comprising instructions to:

display an image including a position indication of a ship and an associated barge assembly formed from a plurality of individual barges; and receive an input and change the configuration of said barge assembly in response to said input.

* * * * *